United States Patent [19]

Takahashi

[11] Patent Number: 5,768,225
[45] Date of Patent: Jun. 16, 1998

[54] PROGRAMMABLE READER FOR NUMERICAL INFORMATION CARRIERS SUCH AS COMPACT DISCS

[76] Inventor: Hiroshi Takahashi, 17-G Wisteria Mansion, Taikoo Shing, Hong Kong

[21] Appl. No.: 630,596

[22] Filed: Apr. 11, 1996

[30] Foreign Application Priority Data

Nov. 4, 1995 [FR] France ................... 9504345

[51] Int. Cl.$^6$ ............................... G11B 17/22
[52] U.S. Cl. ............................ 369/33; 369/32
[58] Field of Search ..................... 369/33, 32, 54, 369/58, 4, 47

[56] References Cited

U.S. PATENT DOCUMENTS

| | | | |
|---|---|---|---|
| 4,779,252 | 10/1988 | Custers et al. | 369/33 |
| 4,872,151 | 10/1989 | Smith | 369/33 |
| 5,063,547 | 11/1991 | Custers et al. | 369/32 |
| 5,173,888 | 12/1992 | An | 369/33 |
| 5,408,449 | 4/1995 | Oh | 369/33 |
| 5,506,821 | 4/1996 | Burton, Jr. | 369/33 |

*Primary Examiner*—Tan Dinh
*Attorney, Agent, or Firm*—Spencer & Frank

[57] ABSTRACT

A reader for digital information carriers (2-2, 2-2) such as compact discs includes a comprises material reading unit (3) for reading of the carrier (2) and a control unit (4). The control unit (4) includes a management unit (5) in order to memorize the "tables of contents" of the carriers (2), a reading control unit (6) adapted to cause reading by the reading unit (3) of a "current" track of the carrier, and sequential programming unit (8) enabling acquisition by the user of a sequence, and its storage in a sequential memory (10). The programming unit (8) is separated from the control unit (6), and the memory (9) of the management unit (5) as well as the sequential memory (10) are conjointly accessible to the programming unit (8) and to the control unit (6) in such a way that the programming unit (8) may in addition be rendered operative during functioning of the control unit (6) in order to enable modification of the content of the the sequential memory (10).

20 Claims, 3 Drawing Sheets

PROGRAMMABLE READER FOR NUMERICAL INFORMATION CARRIERS SUCH AS COMPACT DISCS

BACKGROUND OF THE INVENTION

The invention relates to readers for numerical information carriers such as compact discs.

This invention relates more particularly to the portion adapted to programming these readers, which comprise generally:

material reading means for the carrier, control means comprising:

means for carrier management adapted to memorize data which has been read, forming a "table of contents" identifying all the tracks of information present on at least one carrier, means for controlling reading, adapted to cause, by the reading means, reading of the "current" track of the carrier, after preselection of the latter by the user, and means for sequential programming enabling acquisition by the user of a sequence of track numbers to be read, and storage of this sequence in a zone forming a sequential memory after its validation by the user.

Such a sequence of tracks is habitually termed a program.

In known devices, programming of one or a plurality of sequenced ranges of tracks can only be effected if the material reading means of the carrier are stopped.

In other words, if it is desired to memorize a sequenced range of tracks while one is in the course of reading a given track on a given disc, (called the active state), it is necessary in a first stage to address to the reading means a command to pass from the active reading state to the passive state (a state in which they do not read), then in a second stage to carry out the programming proper.

On the other hand, when reading of the tracks of a memorize program is under way, it is not possible to modify the tracks of the said program which remain to be read. Such an operation also requires stopping the reading means, then programming of a new sequence or modification of the old sequence previously memorized.

Moreover, with the majority of the existing readers, intended to read a multiplicity of discs (double readers, horizontal or lateral loading systems), changing a disc in the course of reading the tracks of a memorized program involves immediate stoppage of the reading means.

In addition, in all the present devices with a single or multiple loading system, programming cannot be carried out except if the control means know the table of contents or tables of contents of the disc or discs loaded. Consequently, as soon as a new disc is loaded, this involves invalidation of any programming. Such drawbacks considerably reduce the ease of use to the user and restrict the programming functions.

SUMMARY OF THE INVENTION

Consequently, one object of the invention is to obtain a reader for numerical information carriers which does not have the drawbacks of readers belonging to the prior art.

For this purpose the invention proposes a reader in which on the one hand the means for sequential programming are functionally separated from the means for reading control, and on the other hand, the memory for the means for carrier management, as well as the sequential memory, are conjointly accessible to the means for sequential programming and to the means for reading control, so that the means for sequential programming may in addition be rendered operative during functioning of the reading control means, in order to allow modification of the content of the said sequential memory, in whatever the state of knowledge of the tables of contents.

The functional separation of the programming and disc control units enables their independent functioning. It is thus possible to carry out programming, whatever may be the state of functioning of the reading means controlled by the control unit.

Preferably, each item in the sequence is memorized in the sequential memory in the form of a couple of data relative to the number of track and of the carrier which contains it.

In a particularly advantageous way, the sequential programming means are adapted, when receiving a command from the reading control means and indicating opening of a mobile element enabling introduction or extraction of one of the carriers indicated by a memorized sequence, to suppress in the sequential memory all the couples comprising data relative to the said carrier accessible by the said open mobile member. By mobile member is meant also a carrier loading drawer, as well as a lid which is at least partially removable, enabling access to one or a plurality of carriers.

Thus, when a disc is replaced, either in a loading means or on a reading means, there follows automatically elimination in the memorized program of all the couples indicating the replaced carrier.

According to another feature of the invention, the sequential programming means are adapted to store in the sequential memory a sequence of numbers of tracks to be read forming a program, without knowing the content of the tables of contents of the carriers indicated by the said sequence.

Otherwise, the sequential programming means are adapted, when there is a need to read one track of one sequence indicating a carrier whose table of contents is not known, to compare, after reading said table of contents, the data of the couple or couples of the said sequence indicating the said carrier to the said table of contents, and to eliminate in the sequential memory the couple or couples comprising data incompatible with the content of the said table of contents.

In this way it is no longer necessary to know the table of contents of each of the discs containing a track of a program to be read. Henceforth, when a track must be read on a disc whose table of contents is not known, firstly its table is read, then the compatibility of the programme's track is tested in comparison with the contents of the table. If the test is conclusive (track present on the disc) reading of the track of the program is then proceeded with.

According to another feature of the invention, the sequential programming means also comprise an auxiliary memory intended, when programming is carried out during the course of reading a given track of a carrier, to memorize a couple of data relative to the said carrier and number of the said given track.

This allows the number of the track in the course of being read to be retained in memory before the program is launched, as well as its carrier, so that, at the end of this program, the user is able to finish listening to the disc which he was originally listening to.

In addition, very advantageously, the sequential programming means are adapted, when a command is received from the reading control means and indicating a replacement, during reading of a program, of the carrier containing the given track memorized in the auxiliary memory, to replace in the said auxiliary memory the couple of data relative to the said track given by a new couple of data of zero value.

Thus, when a disc is replaced in the reader, the control means are capable of knowing if the disc which was being read before the beginning of execution of the program has been replaced.

According to another feature of the invention, the reading control means are adapted after completion of reading of the tracks of a sequence and when the auxiliary memory contains data of non-zero value, to cause reading of a track whose number is that stored in the auxiliary memory, incremented by one unit, and the carrier is that stored in the said auxiliary memory.

In this way, at the end of a program, it is possible, by going to read the contents of the auxiliary memory, automatically to resume listening to the disc which was being read before launching of the said program. This automated function ensures a considerable gain in time for the user, as it liberates him from a series of control commands. It also enables alternate reading between a "master" disc (with non-programmed reading) and one or a plurality of other programmed discs.

According to the invention, when the auxiliary memory contains data of zero value, the reading control means are adapted, after completed reading of the tracks of a sequence, to place the reading means into their passive state.

When the data contained in the auxiliary memory are zero, this means that programming has been carried out while the reading means were in their passive state, or that the disc which was being read before execution of the program has been replaced. In both cases there is no need to command the reading means to go into their active state after completed execution of the program.

According to yet another feature of the invention, the programming means are adapted, during generation of a sequence, to modify and/or suppress and/or add, on the command of the user, at least one couple of data relative to a track number and to its carrier among the couples of the said sequence already memorized in the sequential memory.

In the same way, these programming means are adapted, during reading of the tracks of the program, to modify and/or suppress and/or add, on the command of the user, at least one couple of data relative to a track number and to its carrier among the couples of the said program memorized in the sequential memory.

Thus the user may at any moment revise, in whatever state of the reading means, and whether one is in the course of programmed reading or not, the sequence in the course of formation, avoiding recommencing totally the programming which is under way.

This again reinforces slightly further the flexibility of use of the programming system. Henceforth it is possible, in the case of repetitive (or loop) programming, to modify the contents of the program which must be reused.

In a particular embodiment of the programming means there is provided the possibility that they can eliminate from the sequential memory, on the command of the user, a couple of data of a sequence in the course of reading, from the termination of reading of the track indicated by the said couple of data, so that there exists in the said sequence only couples of data indicating the tracks remaining to be read.

Thus, consultation of the tracks of the program which remain to be read is considerably simplified, since at any given moment there exists in the sequence only the tracks which have not yet been read.

Naturally, this function does not permit loop programming, which requires conservation of all the tracks of the program.

In a particularly advantageous way, the programming means are adapted, after memorization of a program and in the case of recognition of the data of non-zero value in the auxiliary memory, to command the control means to read the tracks of the said program.

On the other hand, after memorization of a program, and in the case of recognition of zero-value data in the auxiliary memory, the programming means are adapted to wait for a command from the user ordering the control means to read the tracks of the said program.

Thus, upon simple reading of the data contained in the auxiliary memory, the programming means determine whether the program must be launched automatically upon the end of acquisition of the program, or whether they must wait for a command from the user in order to carry out this launch.

The invention likewise proposes a process of controlling by programming a reader of numerical information carriers such as a compact disc.

This process comprises:

a first stage in which acquisition is carried out of a sequence of couples of data relative to the number of a track and of the carrier which contains it, and storage of a sequence in a zone forming a sequential memory, without knowing beforehand the table or tables of contents of the carriers of the tracks of the sequence;

a second stage in which the table of contents of the support is read, comprising the nth track to be read of the memorized sequence;

a third stage in which the content of the table of contents of the carrier comprising the nth track of the sequence in the course of reading is compared to the data of the couples of this sequence indicating the said carrier, and in the sequential memory, or the couple or couples comprising data incompatible with the contents of the said table of contents are suppressed, and a fourth stage in which, as a function of the result of the comparison carried out during the third stage, there then follows either reading of the information stored in the nth track, or reversion to the second stage in order to apply the process to the track following the nth track of the sequence to be read.

Other features and advantages of the invention will become apparent upon examining the following detailed description, made by way of example, and on examining the annexed drawings.

DESCRIPTION OF THE PREFERRED EMBODIMENT

Figure 1:
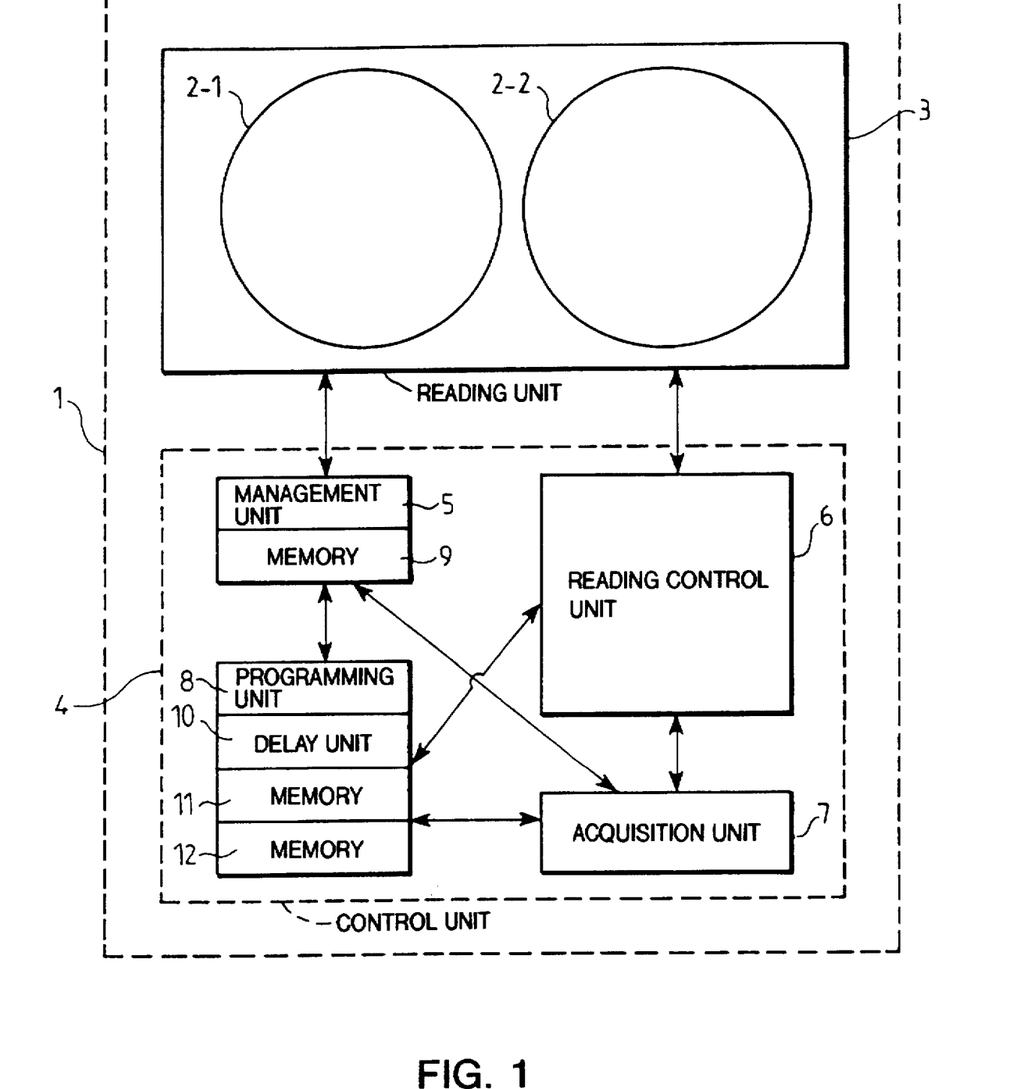
FIG. 1 is a diagram illustrating a portion of a reader according to the invention.

Reference will firstly be made to FIG. 1, which shows diagrammatically a reader 1 according to the invention, intended to read two discs 2-1 and 2-2 placed on disc turntables.

Naturally the invention also applies to readers intended to read a single disc or a plurality of discs.

Each disc 2 comprises information of the numerical or digital type stored in tracks produced on one of its surfaces and being capable of detection by a reading control unit 6.

The reader 1 comprises a reading unit or means 3 of the laser diode type, capable of reading the numerical information stored in these tracks, and a control unit or means 4 intended to transcribe into signals the commands of the user. These commands may be either addressed by means of commands by activation of control keys located on the facade of the reader 1, or addressed by means of waves with the aid of a remote control box.

The control means 4 are produced with the aid of electronic components which the person skilled in the art may buy in the trade.

They comprise a disc management unit 5, the reading control unit 6, a sequenced programming unit 8 and an acquisition unit 7.

It is clear that the various units constituting the control means 4 of the reader are not obligatorily physically separated. It is therefore possible to envisage a single multitasking microprocessor or quasi-multi-tasking microprocessor combining the said units.

The acquisition unit 7 comprises the function keys placed on the facade of the reader 1, and means of display of the light-emitting diode type, or segments of liquid crystals, enabling display of information relating to the state of functioning of the reader, to the content of the discs, and to the function keys.

The control unit 6 is designed to serve as an interface between the acquisition unit 7 and the reading means 3. Any command entered at the facade (manually or by means of waves) is thus converted into the form of one or a plurality of specific signals adapted to cause to function the reading means 3, or to cause programming with the aid of the programming unit 8, or again to interact with the disc management unit 5.

The management unit 5 ensures management of the tracks of each disc 2. It comprises a management memory 9 in which the control means 4 memorize the tables of contents of each of the discs previously loaded on the turntable platforms, and/or of which one track at least has already been read. These tables of contents contain information relating to the number of tracks on the disc (or carrier) on their respective durations and on the total duration of the disc.

Naturally, in the case of removal or replacement of a disc, its table of contents is automatically deleted from the management memory 9.

The programming unit 8 comprises a delay unit or means 10, a sequenced memory 11 and an auxiliary memory 12.

This programming unit is connected by a first portion to the acquisition unit 7 which comprises the function keys specific to programming, carrying a second portion to the management unit 5, and more specifically to its management memory 9, permitting access to the contents of the tables of contents, and by a third portion to the reading control unit 6.

In present-day readers, the programming unit forms physically and functionally a part of the control unit. Thus it cannot function independently thereof.

Now, during elaboration of a sequence of couples data pairs or of data forming a program, a couple of data indicating a given track and the carrier which contains it, cannot be accepted by the control unit except if this couple is compatible with the table of contents of the indicated carrier. If this is not the case, the couple acquired by the user is rejected. Therefore this requires that all the tables of contents of the carriers indicated by the couples of the program are stored in the management unit before acquisition of the program.

Consequently, programming cannot be carried out on the one hand if the reading means are in their active state, since the latter are managed by the control means, and on the other hand if there is incompatibility between one of the couples to be acquired and the memorized tables of contents.

On the other hand, in readers according to the invention, although the programming unit 8 and the control unit 6 are connected to one another, they can nevertheless function in a manner independently of one another.

It is thus possible to acquire couples of data without these being compatible with the tables of contents memorized in the management memory 9, or when one at least of the tables is not memorized.

Thus dynamic programming can be carried out (during the course of reading) but likewise a program may be modified in real time while it is in the course of execution.

Naturally, such a device permits memorization of a plurality of programs if necessary, as well as their modification.

According to the invention, verification of compatibility of a couple of data is no longer effected during acquisition of the couples of data of the program. It is henceforth effected by the programming unit 8 during execution of the said program, just after reading of the couple placed in front of it in the sequence forming the program.

In effect, in order to gain time, upon each first occurrence of a carrier (k) in a sequence, the programming unit 8 goes to see in the management memory 9 whether it contains the table of contents of the carrier concerned. If this is not the case, the programming unit 8 asks the control unit 6 to cause reading of the table of contents of the carrier concerned by the reading means 3. This table is then memorized in the management memory 9.

Knowing the table of contents of the carrier concerned, the programming unit 8 proceeds to verify all the couples of data indicating the carrier concerned. Any couple of data indicating the carrier concerned which is incompatible with the table of contents of the carrier concerned is then automatically deleted from the sequential memory 10. Execution of the program then proceeds either by reading the track indicated by the verified couple, or by verifying the couple following if this has not already been done.

This verification procedure will be described in detail later.

The delay means 10 is a timed counter which starts automatically as soon as the function key for the main program is actuated, or after each acquisition of a couple of data by the user.

This main programming function key indicates to the programming unit 8 that the user wishes to begin acquisition of a sequence of tracks so as to produce a reading program. It therefore generates a program initiating message which is addressed to the programming unit 8.

The duration of timing is fixed at the time of manufacture of the reader. It will be for example equal to 10 seconds.

If no programming function key is actuated during this period of 10 seconds, the programming unit considers that programming is either abandoned by the user (if no acquisition has been carried out), and thus the current state of the reader is not modified, or that there is no longer a couple of data to be acquired, and consequently the programming unit 8 inserts after the last couple acquired an end-of-program message.

The delay means is embodied by a segment of liquid crystals which, as soon as the main programming function key has been actuated, is placed in a state in which it flashes in the vicinity of this main programming function key. At the end of the delay period, if no other programming key has been validated, this liquid crystal segment extinguishes finally if no couple has been chosen, or it remains lit continuously in order to indicate that a program is memorized.

This main key will likewise serve to modify a program after its memorization.

The auxiliary memory 12 allow storage of a couple of data (n, m) representative of the track (n) in course of reading, and of the disc (m) which contains it at the moment when programming is carried out. If programming is carried out while the reading means 3 are in their passive state, or if the disc which was being read before acquisition of the program is replaced by another disc, the stored couple is the couple (0, 0).

Such an arrangement enables the reader according to the invention to function in accordance with at least two different modes, thus considerably increasing the ease of listening for the user.

In a first mode, after reading all the tracks of the program, the control unit 6 commands the reading means 3 to read the track (n+1) which follows that (n) which has been memorized in the auxiliary memory 12. To this effect the control unit 6 is connected to the auxiliary memory 12. Naturally, if the content of this memory is empty, there is no appeal to the reading means 3, which are placed by the control unit 6 in their passive state.

This first functioning mode thus ensures automatic return of the reading means 3 to the reading position, after execution of a program.

In a second functioning mode, after reading all the tracks of a program, the control means 6 commands stoppage of the reading means 3, thus leaving the user free either to command reading of any track of one of the discs, or to return in a semi-automatic manner to the track which follows that which had been memorized in the auxiliary memory 12.

In the latter case, there is provided a specific function key on the facade which by simple actuation enables such a return. Such a key asks the control unit 6 to read the contents of the auxiliary memory 12, then to increment by one unit the number (n) associated with the track stored in that memory, in order to command the reading means 3 to read the said corresponding track (n+1).

There may likewise be provided a specific key enabling simple display of the data stored in the auxiliary memory 12.

It is clear that one may envisage readers equipped with electronic circuits permitting the first and/or second mode of functioning. Consequently, in the hypothetical case where the reader operates only in the first mode, it will not be necessary to equip it with a specific key ensuring a totally automatic return.

On the other hand, if provision is made to couple the first and second modes, the reader must be equipped with a specific key affording access to each of the two modes. Thus, at the end of programming, if the specific key is actuated, the reader is locked in its second functional mode, which will cause a fully automatic return, while upon not actuating a specific key, the reader is locked in its second functioning mode.

Figure 2:
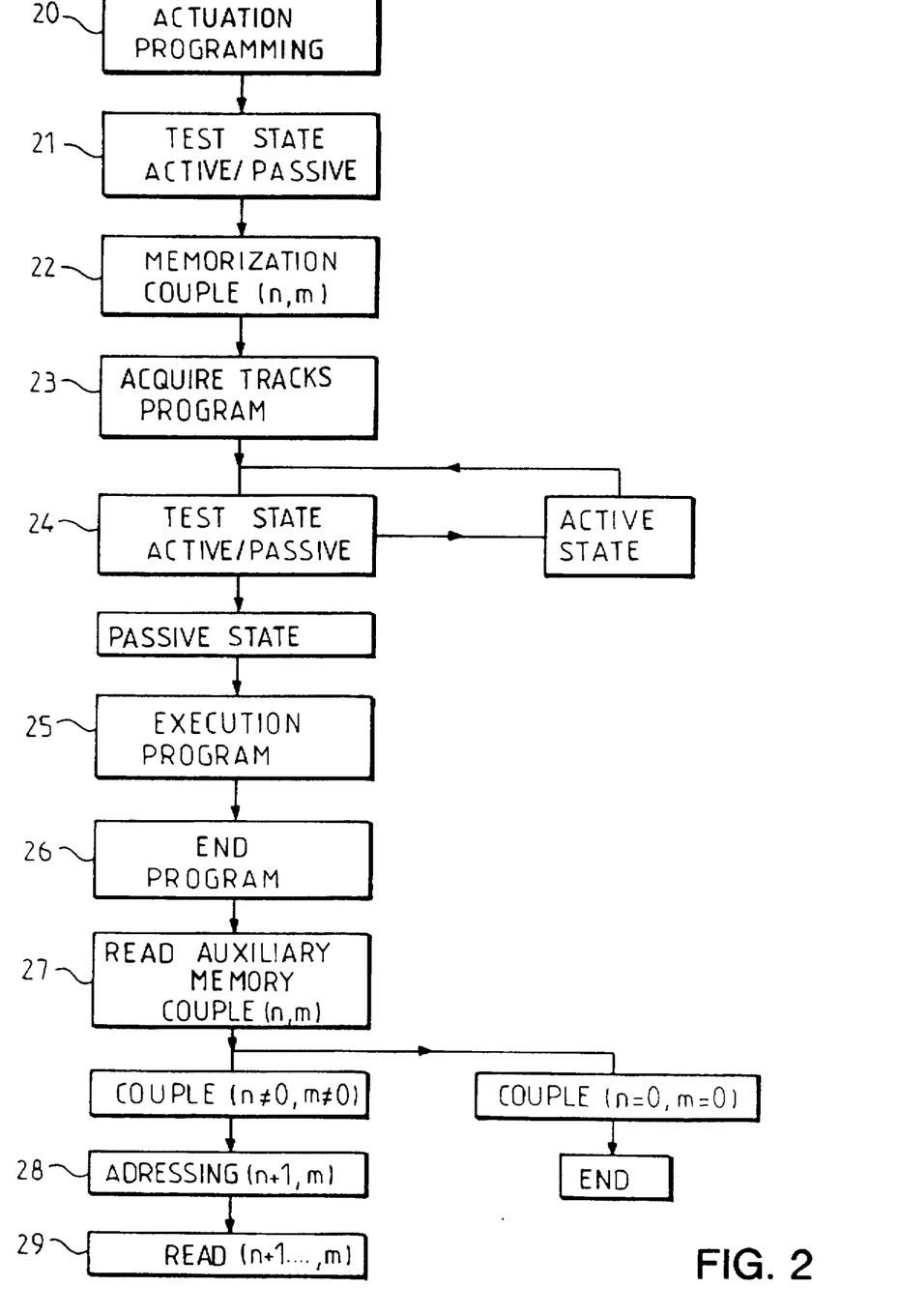
FIG. 2 is a diagram illustrating a programming procedure for a reader according to the invention.

Reference will now be made to FIG. 2 in order to describe in more detail a possible programming mode of a reader according to the invention.

In the step 20, actuating of the function key for main programming generates a program-initiating message which is addressed to the programming unit 8. This on the one hand triggers counting by the delay means 10 and on the other hand verification at step 21 of the step of functioning of the reading means 3 by the control unit 6, said state being either active (disc being read), or passive (reading means 3 out of operation).

The system then passes to step 22 in which the programming unit 8 reads the contents of the memory 9 of the management unit 5, which contains in real time the number of the track being read, as well as the disc which carries it. This content is then memorized in the auxiliary memory 12 in the form of a couple of data (n, m) representative of the number (n) of the track and of the number (m) of the disc containing this track.

If the state of the reading means 3 is active, n and m are different from zero. On the other hand, if their state is passive, then n equals m equals zero.

The system then passes to step 23 during which the sequence is generated.

This sequence, forming a program, is stored in the sequential memory 10 of the programming unit 8 in the form of a succession of couples (j, k) of data representing a track number (j) and the number of the corresponding disc (k), in the image of the couple (n, m) memorized in the auxiliary memory 12.

These couples of data may be stored in all the forms known to the person skilled in the art, as for example in the form of a sequence of binary numbers, or a string of characters.

The system then passes to step 24 in which it proceeds to a new verification of the state of functioning of the reading means 3, as described above in step 21.

Again, two cases are presented.

If the state of the reading means is active, the system waits for the end of reading of the current track (n, m). This operation is carried out for example by effecting successive interrogations until a signal is obtained indicating that the reading means 3 are in their passive state. However there may also be envisaged a system of waiting until the control unit 6 addresses to the programming unit 8 an end-of-track signal. The reading means 3 are then placed in their passive state.

According to the invention, when the reading means has become passive, i.e. if the contents of the auxiliary memory comprises data of non-zero values, the program is launched automatically as soon as it has been acquired and its memorization is complete. The system then passes to step 25, during which execution of the memorized program is carried out.

On the other hand, when the state of the reading means 3 is passive in step 21, i.e. when the content of the auxiliary memory comprises data of zero value, the programming unit is put in a waiting state until it receives from the user a command to launch the program which has just been memorized. Actuation of any of the control keys located on the facade of the reader will then trigger launching of the program in step 25.

Naturally a specific function key may be provided authorising launching of a memorized program.

Figure 3:
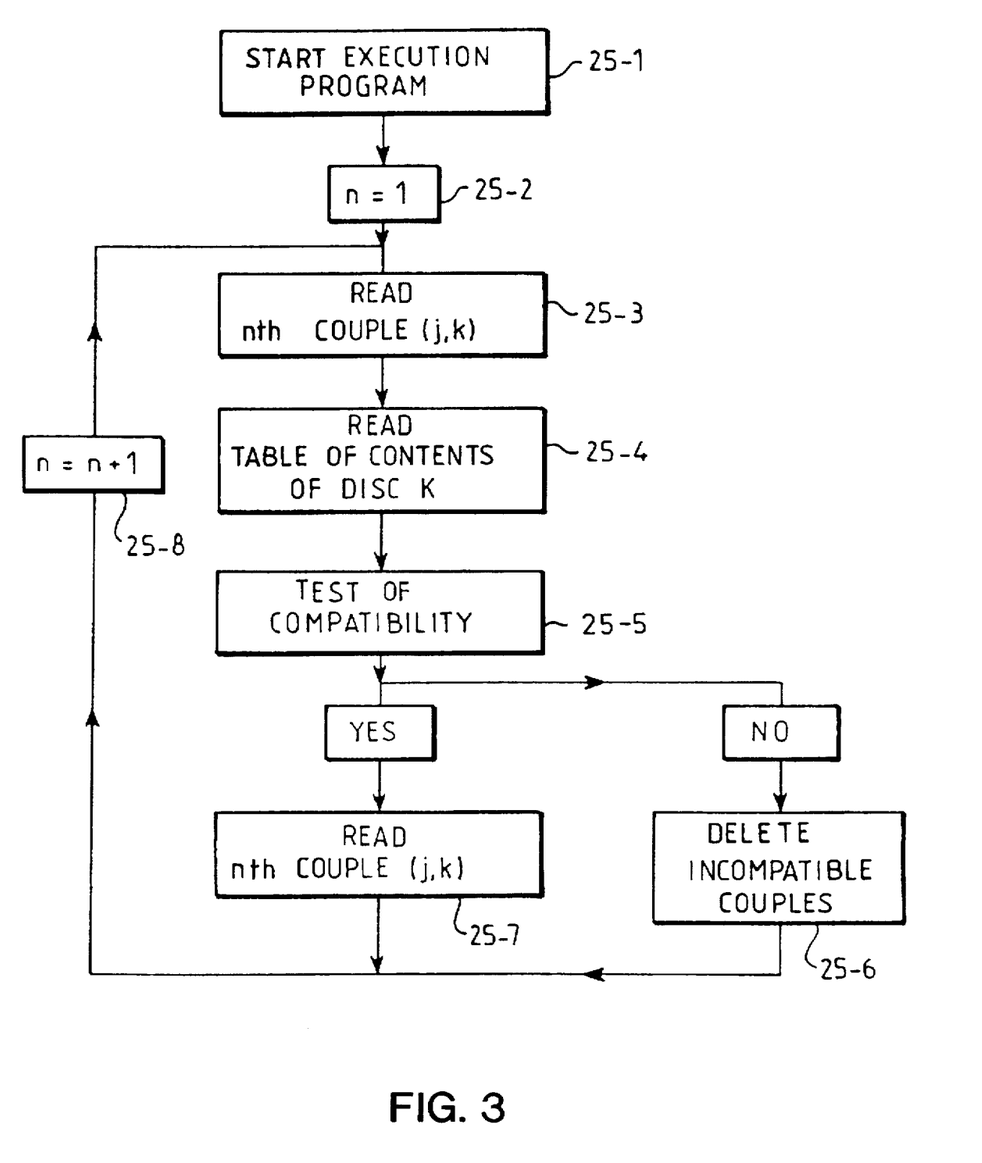
FIG. 3 is a diagram illustrating stage 25 of the procedure illustrated in FIG. 2.

In order to describe this step 25, reference will be made to FIG. 3.

Step 25-1 marks the beginning of execution of the program. At step 25-2, the programming unit 8 establishes at value 1 a position counter indicating the position of the couple in the sequence. Then, at step 25-3, it reads the content of the first couple (j, k) of the sequence, where j indicates the number of a track and k its carrier.

In step 25-4, the programming unit 8 looks in the management memory 9 to see whether it contains the table of contents of the carrier concerned (k). If this is not the case, the programming unit 8 asks the control unit 6 to cause the reading means 3 to read the table of contents of the carrier concerned (k). This table is then memorized in the management memory 9.

Knowing the table of contents of the carrier concerned, the programming unit 8 proceeds to verify all the couples of data (x, k) indicating the carrier (k) concerned. This constitutes step 25-5.

Any couple of data which is incompatible with the table of contents of this carrier concerned (k) is then automatically deleted from the sequence initially memorized in the sequential memory 10, thus constituting step 25-6.

The program is then executed at step 25-7, either by reading the track (j) indicated by the verified couple (j, k) or by verification of the following couple, if this has not already been done, by returning to step 25-3, and after having incremented by one unit the position counter, at step 25-8.

In the first case, after reading the track (j) indicated by the first couple (j, k), the position counter is incremented by one unit in step 25-8, bringing it to step 25-3, where compatibility of the second couple of data of the sequence (except if the carrier which it indicates is the same as that of the preceding couple (k)), is verified. In this case, reading of the indicated track is directly effected, then the system passes to the following couple, and so on until the track indicated by the last couple of the sequence is read.

According to the invention, a program may be executed according to two sub-modes.

In a first sub-mode, the programming unit manages the position of the couples of data in the sequence memorized, with the aid of a displaceable pointer. Upon launching a program, the pointer is positioned facing the first couple of the sequence. The programming unit 8 addresses to the control unit 6 the couple of data placed opposite the pointer, enabling this control unit 6 to command the reading means 3 to read the track corresponding to the couple of data received.

At the end of reading of this page, the control unit 6 addresses to the programming unit 8 a message indicating that the system may pass to the following track of the sequence. This automatically causes displacement of the pointer from the first couple to the second couple of the sequence. The programming unit 8 is then in a position to address, after verifying its compatibility, the second couple indicated to the control unit 6, and the operation of reading/displacement/verification/addressing is reproduced until the pointer arrives opposite the last couple of the sequence.

In a second sub-mode, the couples of the sequence are positioned one above the other in order to produce a stack. At the start of execution of the program, a fixed pointer is positioned at the top of the stack facing the first couple of the sequence, permitting the programming unit 8 to address this couple, after verification of its compatibility, to the control unit 6, so that it can order it to be read. At the end of reading of the track, the control unit 6 addresses to the programming unit 8 a message indicating that it can send the second couple of the sequence. On reception of this message, the couple which was facing the pointer is deleted from the stack, and all the following couples rise by one position in the stack, the second couple now being opposite the pointer, enabling the programming unit 8 simply to address this new couple to the control unit after verification of its compatibility.

In the second sub-mode, the couples of a sequence of a program are thus deleted as they are read. As a consequence, at the end of execution of a program it is no longer possible to recover the content of said program. Naturally it can be envisaged that an annex memory may be provided enabling memorization of the initial sequence.

Whatever sub-mode may be chosen, at the end of execution of a program the system passes to step 26 in which the programming unit addresses to the control unit 6 a message indicating that the program is terminated.

In the hypothetical case where the reader can function only in the first mode described above (totally automatic return) the control unit 6 reads the content of the auxiliary memory 12, constituting step 27.

The content of this memory is the couple of data (n, m) where n is the track number and m the disc number.

If n equals m equals zero, this means that the program which has just been executed was begun while the reading means were in their passive state, or that the disc which was being read during acquisition of the program has been replaced. Programming is then terminated. The programming unit 8 addresses to the control unit 6 a message instructing it to put the reading means 3 into the passive state.

If n and m are both different from zero, this means that the program which has just been executed was begun after reading of the track number n of the disc number m.

The programming unit 8 then increments by one unit the number n, which then becomes the number n+1, which constitutes step 28, and then in step 29 the programming unit addresses to the control unit 6 a message asking it to place the reading means 3 at the start of track n +1 of the disc m in order to read the content thereof. The programming procedure is then terminated and reading of disc m begins again at track n+1.

It is clear that in the hypothetical case where the reader can only operate in the second functioning mode described above (semi-automatic return), steps 27 to 29 need not exist.

In this case, resumption of reading of the disc m from track n+1 will be carried out by actuating a specific key as described above, said key alone ensuring execution of steps 27 to 29.

During step 23, of acquisition of the tracks of a program, it is possible, as is known, to carry out a secondary procedure of modification of the tracks already memorized, whatever step the reading means 3 are in (active or passive states).

Otherwise, thanks to the independent functioning of the programming unit 8 and control unit 6, it is likewise possible to modify a program memorized while the latter is being executed.

According to the functional sub-mode selected, these modifications will apply to any one of the tracks of the program (first sub-mode in which the couples of a sequence are maintained integrally in the sequential memory) or only on the tracks of the program which have not yet been read (second sub-mode in which the couples of a sequence are deleted as the track corresponding thereto is read).

Otherwise, if one of the drawers which comprises one of the loaded discs indicated by one of the couples of a program, is replaced, this automatically involves deletion from the sequential memory of all the couples comprising data indicating this replaced disc. This automatic procedure is applied whatever may be the state of the reading means or of the programming unit. It is thus applied during programming, during execution of a program, or during conventional reading if a program is memorized.

Finally, the acquisition means 7 likewise comprise a cancelling key mounted on the facade of the reader 1 and connected to the programming unit 8, and adapted to delete at any moment a memorized program or the tracks of a program being read, thus interrupting a program during its execution.

It is clear that the procedures described above are given by way of example and may be adapted by the person skilled in the art depending on the use envisaged.

Moreover, the invention may be applied to any numerical information carrier of the compact disc, audio and/or video type, but it may also be envisaged as applied to magnetic tape readers of the audio and/or video type.

Similarly, in the present invention, the word reader must be understood in its widest sense. It likewise covers recorders. Consequently, the present invention likewise applies to these latter.

What is claimed is:

1. An improved reader for numerical information carriers, the reader including
    material reading means (3) for reading the carriers (2), and
    a control unit (4) which includes
        carrier management means (5), including a management memory (9), for storing in the management memory (9) a table of contents identifying all the tracks of information present on at least one carrier (2),
        reading control means (6) for controlling the reading means (3), including causing the reading means (3) to read a current track that has been selected by a user, and
        sequential programming means (8), including a sequential memory (11), for storing in the sequential memory (11) a sequence of track numbers of tracks to be read, the tracks to be read having been selected by the user,
    wherein the improvement comprises:
        the sequential programming means (8) are functionally separated from the reading control means (3), and
        the management memory (9) of the carrier management means (5) and the sequential memory (11) are jointly accessible to the sequential programming means (8) and to the reading control means (6), so that the sequential programming means (8) is selectively operable during functioning of the reading control means (6), in order to permit modification of the contents of the sequential memory (11).

2. A reader according to claim 1, wherein the sequential memory (11) comprises means for storing each item in the sequence in the form of a data pair, the data pair identifying the number of a track and of the carrier (2-i) which contains it.

3. A reader according to claim 2, wherein the reading control means (6) comprises means for issuing a command indicating opening of a mobile element enabling introduction or extraction of one of the carriers indicated by a stored sequence, and wherein the sequential programming means (8) comprises means, responsive to the command, for suppressing in the sequential memory (11) all the data pairs pertaining to the carrier accessible by the opened mobile member.

4. A reader according to claim 1, wherein the sequence of track numbers of tracks to be read forms a program, and wherein the sequential programming means (8) comprises means for storing the program in the sequential memory (11) without information about the tables of contents of the carriers indicated by the program.

5. A reader according to claim 4, wherein the sequential memory (11) comprises means for storing each item in the sequence in the form of a data pair, the data pair indicating the number of a track and the carrier (2-i) which contains it, and wherein when there is a need to read one track of one sequence indicating a carrier whose table of contents is not known, after reading said table of contents, the sequential programming means compares the data pair or pairs of the sequence indicating the carrier to the table of contents, and eliminates from the sequential memory (11) any data pairs that are incompatible with the table of contents.

6. A reader according to claim 1, wherein the sequential programming means (8) further comprises an auxiliary memory (12) which, when programming is carried out during the course of reading a given track of a given carrier, stores a data pair identifying the given carrier and the number of the given track.

7. A reader according to claim 6, wherein the sequential memory (11) comprises means for storing each item in the sequence in the form of a data pair, the data pair identifying the number of a track and of the carrier (2-i) which contains it, wherein the reading control means (6) comprises means for issuing a command indicating opening of a mobile element enabling introduction or extraction of one of the carriers, and wherein the sequential programming means (8) further comprises means, responsive to the command issued by the reading control means (6) if the command is issued during reading of a program and pertains to a mobile element for the given carrier, for replacing the data pair in the auxiliary memory by a new data pair having zero value.

8. A reader according to claim 6, wherein the reading control means (6) further comprises means for causing reading of a track whose number is identified by the data pair stored in the auxiliary memory (12), incremented by one unit, from the carrier identified by the data pair stored in the auxiliary memory (12), after completion of reading of the tracks of a program if the auxiliary memory (12) contains a data pair of non-zero value.

9. A reader according to claim 6, wherein the reading control means (6) further comprises means for placing the reading means (3) in a passive state after completion of reading of the tracks of a program if the auxiliary memory (12) contains a data pair having a zero value.

10. A reader according to claim 1, wherein the sequential memory (11) comprises means for storing each item in the sequence in the form of a data pair, the data pair identifying the number of a track and the carrier (2-i) which contains it, and wherein the programming means (8) further comprises means for at least one of modifying, suppressing, and adding at least one data pair stored in the sequential memory (11) upon a command by the user during generation of a sequence.

11. A reader according to claim 1, wherein the sequential memory (11) comprises means for storing each item in the sequence in the form of a data pair, the data pair identifying the number of a track and the carrier (2-i) which contains it, wherein the sequence forms a program, and wherein the programming means (8) further comprises means for at least one of modifying, suppressing, and adding at least one data pair stored the sequential memory (11) upon a command by the user during reading or the tracks of the program.

12. A reader according claim 1, wherein the sequential memory (11) comprises means for storing each item in the sequence in the form of a data pair, the data pair indicating the number of a track and the carrier (2-i) which contains it, and wherein the programming means (8) further comprises means for deleting from the sequential memory (11) a data pair of a sequence in course of being read, from the completion of reading of the track indicated by the date pair, so that there exist in the sequence only date pairs indicating the tracks remaining to be read.

13. A reader according to claim 6, wherein the sequential memory (11) comprises means for storing each item in the sequence in the form of a data pair, the data pair indicating the number of a track and the carrier (2-i) which contains it, wherein the sequence forms a program, and wherein the programming means (8) further comprises means for commanding the reading control means (6) to read the tracks of the program after the program has been stored, if a data pair having a non-zero value is stored in the auxiliary memory (12).

14. A reader according to claim 6, wherein the sequential memory (11) comprises means for storing each item in the sequence in the form of a data pair, the data pair indicating the number of a track and the carrier (2-i) which contains it, wherein the sequence forms a program, and wherein the programming means (8) further comprises means for waiting for a command by the user to instruct reading control means (6) to read the tracks of the program after the program has been stored, if a data pair having a zero value is stored in the auxiliary memory (12).

15. A reader according to claim 1, wherein the programming means (8) further comprises timing means for counting out a predefined period of time after each acquisition of a track of a sequence, and for generating an end-of-sequence signal when the period of time has passed without a new acquisition of a track.

16. A reader according to claim 1, wherein the sequence comprises a program, and further comprising a cancelling key connected to the programming means (8) to cancel a stored program.

17. A method of control by programming a reader of numerical information carriers having tracks and tables of contents, comprising the steps of:

a) conducting acquisition of a sequence of data pairs, each data pair identifying a track number and the carrier which contain the track;

b) storing the sequence in a sequential memory (11), without knowing beforehand the table or tables of contents of the carriers of the tracks of the sequence;

c) reading the table of contents of a carrier which the stored sequence indicates as having the $n^{th}$ track to be read of the stored sequence;

d) comparing the table of contents of the carrier which the stored sequence indicates as having the $n^{th}$ track of the sequence, in the course of reading, to the data pairs of the sequence stored in the sequential memory (11);

e) if one or a plurality of data pairs are incompatible with the table of contents that is compared in step (d), suppressing the incompatible data pairs or the plurality of data pairs; and f) reading of the information stored in the $n^{th}$ track, or incrementing n and reverting to step (c) in order to apply the process to the track following the $n^{th}$ track of the sequence to be read.

18. A reader according to claim 1, wherein the carriers (2) are compact discs.

19. A reader according to claim 1, wherein the sequence comprises a program, and further comprising a cancelling key connected to the programming means (8) to cancel tracks of the program remaining to be read.

20. The method of claim 19, wherein the information carriers are compact discs.

* * * * *